United States Patent Office 3,702,325
Patented Nov. 7, 1972

3,702,325
INDOLE ALKALOID DERIVATIVES
Yves Louis-Marie Fellion, Gagny, France, assignor to
Laboratoires Toraude, Paris, France
No Drawing. Filed Aug. 7, 1969, Ser. No. 848,357
Int. Cl. C07d 35/32
U.S. Cl. 260—240 AL
6 Claims

ABSTRACT OF THE DISCLOSURE

Certain 1-substituted derivatives of reserpine, including rescinnamines and methoserpidines, have useful pharmaceutical properties. They may be prepared by 1-cyanoethylation of the parent alkaloid followed by conversion of the 1-propionitrile substituent into other groups.

This invention relates to certain derivatives of indole alkaloids, to pharmaceutical compositions containing them and to a process for their preparation.

Certain derivatives of indole alkaloids, particularly in the reserpine series, are known to have antihypertensive properties. They are derivatives with amine substitution at various positions in the reserpine nucleus, such as 11-dimethylaminodeserpidine described in French specification 1,238,752.

We have now discovered that certain novel derivatives of reserpine which contain, attached to the indole nitrogen atom, a functional chain obtained by cyanoethylation, have important pharmacological properties. Although these derivatives retain the desired activity of the basic alkaloid, for example an antihypertensive activity, they have no undesirable side effects (for example, sedative or depressive effects) on the central nervous system. Generally, also, these derivatives are much less toxic than the parent alkaloid.

The novel reserpine derivatives of the present invention have the formula:

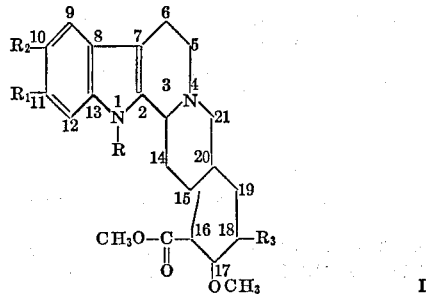

wherein $R_1$ and $R_2$, which may be the same or different, are each a hydrogen atom or a methoxy group, $R_3$ is

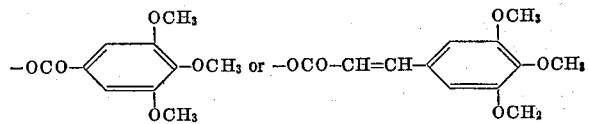

and R represents a 2-cyanoethyl ($-CH_2-CH_2-CN$)

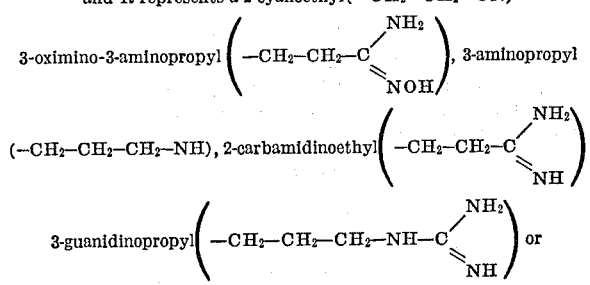

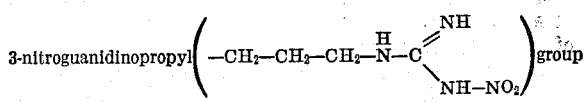

The invention includes the acid addition salts of the compounds of Formula I.

The invention relates in particular to the 1-propionitrile, 1-propionamidoxime, 1-propylamine, 1-propionamidine and 1-propylguanidine derivatives of the compounds of the reserpine series (reserpine, rescinnamine, methoserpidine).

Reserpine has the formula:

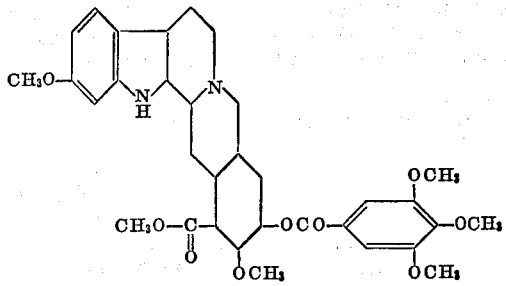

rescinnamine has the formula:

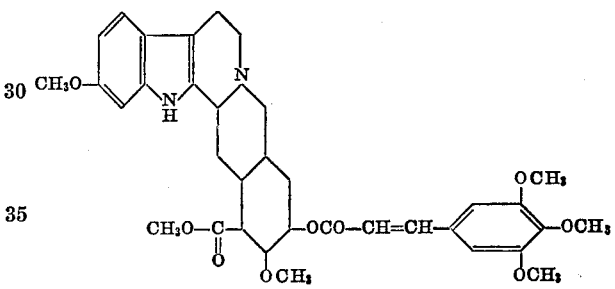

and methoserpidine has the formula:

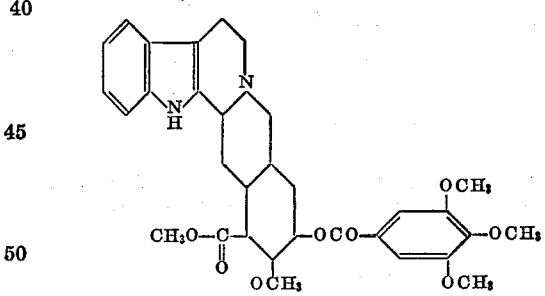

The invention includes pharmaceutical compositions comprising a reserpine derivative of the invention and a physiologically acceptable carrier therefor. The compositions may be in any suitable form, such as tablets, capsules, dragées, pills, suppositories or in solution or suspension in a sterile physiologically acceptable liquid.

The invention also includes processes for preparing the compounds of the invention.

The first stage of this process consists in cyanoethylation of the parent alkaloid, i.e. by reaction of acrylonitrile with the alkaloid in the presence of a catalyst, such as benzyltrimethylammonium hydroxide, in an inert organic solvent. This produces the above-mentioned 1-propionitrile derivatives.

The propionamidoxime derivatives according to the invention are obtained in a second stage by the action of hydroxylamine on the propionitrile derivatives obtained in the first stage.

By effecting carefully controlled hydrogenation of the propionitrile derivatives which preserves the alkaloid skeleton, the 1-propylamine derivatives may be obtained. This controlled hydrogenation consists in reacting gaseous ammonia with the propionitrile derivative in the presence of Raney nickel in absolute alcohol in an autoclave at a temperature of at least 100° C. and at a pressure of about 120 atmospheres.

The propionamidine derivatives are prepared from the propionitrile derivatives by first forming the iminoester by reaction with absolute ethanol in the presence of gaseous hydrochloric acid. The iminoester, when treated with gaseous ammonia, yields the desired amidine.

The propylguanidine derivatives are prepared either from the propylamine derivatives by reaction in an alcoholic medium with S-methylisothiourea or N-nitro-S-methylisothiourea, or by hydrogenation of the nitroguanidinopropyl derivatives.

The following reaction scheme shows the various process stages. In this schematic representation, only the indole nitrogen in position 1 of the alkaloid is shown.

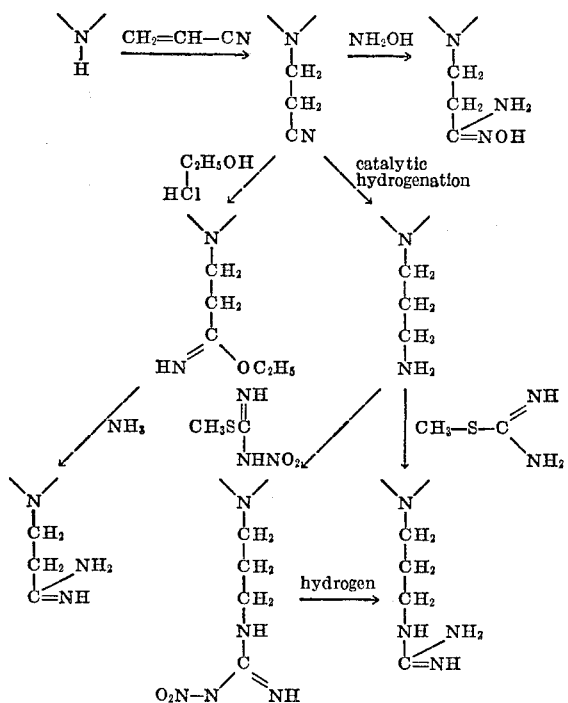

The invention is further described in the following examples which are given by way of illustration only.

EXAMPLE 1

Reserpine-1-propionitrile

In a glass reactor fitted with a mechanical stirrer and a condenser, 18.2 g. (0.03 mol) of reserpine were suspended in 250 ml. of anhydrous benzene and 200 ml. of acrylonitrile were added. The reaction mixture was heated to 40° C. and 1.5 ml. of Triton B (40% methanol solution of benzyltrimethylammonium hydroxide) were poured into the reactor. The reaction started rapidly, being accompanied by total solution of the suspension and then by precipitation of polymer. The reaction was allowed to proceed for 45 minutes at 60° C.

The reaction mixture was then concentrated to dryness and the polymer was separated from the nitrile that had formed by extracting the latter with benzene under reflux.

The crude nitrile was obtained by concentration of the benzene solution, and was then purified by crystallisation from methanol. M.P.=230° C. (Kofler), yield 80%.

Analysis.—$C_{36}H_{43}N_3O_9$; molecular weight 661.72.— Theoretical (percent): C, 65.33; H, 6.54; N, 6.35; O, 21.76. Found (percent): C, 65.51; H, 6.35; N, 6.25; O, 21.59.

Infra-red spectrum band characteristic of group

—C≡N at 2260 cm.$^{-1}$

EXAMPLE 2

Reserpine-1-propionamidoxime

In a glass reactor fitted with a mechanical stirrer and a condenser, 6.6 g. (0.01 mol) of reserpine-1-propionitrile were suspended in 200 ml. of ethyl alcohol and the suspension heated to 95° C.

Five times the theoretical required quantity of hydroxylamine hydrochloride (3.5 g.) was added to the nitrile suspension and the hydroxylamine was liberated by adding a saturated solution of $Na_2CO_3$. The pH of the reaction medium was not allowed to exceed 7. The mixture was left for 15 hours at a temperature of no more than 50° C.

Concentration of the reaction solution gave the amidoxime in a crude state. The mineral salts were eliminated by extraction and the amidoxime was crystallised from methanol.

Colourless crystals, M.P.=165° C. (Kofler). Yield: 65%.

Analysis.—$C_{36}H_{46}N_4O_{10}$; molecular weight 694.75.— Theoretical (percent): C, 62.23; H, 6.67; N, 8.06; O, 23.03. Found (percent): C, 62.18; H, 6.78; N, 7.91; O, 22.94.

| Infra-red spectrum: | Cm.$^{-1}$ |
|---|---|
| =N—OH | 3460 |
| N—H . . . H | { 3360 / 3180 |

EXAMPLE 3

Reserpine-1-propylamine 10 g. of reserpine-1-propionitrile, 200 ml. of absolute ethanol, 2.6 g. of gaseous ammonia and 5 g. of Raney nickel were placed in an autoclave and reduction was effected at 130° C. and 120 atmospheres pressure for 6 hours.

After elimination of the catalyst, the amine formed was isolated in the form of the dihydrochloride and crystallised from isopropanol. M.P.=241° C. (Kofler). Yield 95%.

Analysis.—$C_{36}H_{49}N_3O_9 2HCl$; molecular weight 738.68. —Theoretical (percent): C, 58.53; H, 6.68; N, 5.69; O, 19.49; Cl, 9.60. Found (percent): C, 58.37; H, 6.75; N, 5.51; O, 19.30; Cl, 9.19.

EXAMPLE 4

Reserpine-1-propylnitroguanidine

A suspension of 3 g. of aminopropylreserpine and 0.6 g. of N-nitro-S-methyl-isothiourea was made up in 60 ml. of absolute ethanol. The suspension was heated for 20 hours at 50° C. and then left at ambient temperature for two days. The resulting mixture was evaporated to dryness and chromatographed on alumina. The desired produce was isolated as the chlorohydrate crystallising from a benzene/acetone mixture (1:3 by volume). Yellowish crystals were formed (M.P. 210° C.).

Analysis.—$C_{37}H_{48}N_6O_{11}$·HCl: Theoretical (percent): C, 56.30; H, 6.26; N, 10.65; O, 22.30; Cl, 4.49. Found (percent): C, 56.04; H, 6.22; N, 10.43; O, 22.20; Cl. 4.46.

EXAMPLE 5

Reserpine-1-propylguanidine 0.5 g. of the reserpine-1-propylnitroguanidine was hydrogenated at 60° C. and 50 atmospheres for 3 hours in an alcoholic medium. The product was recrystallised from acetone (melted 205–230° C. Kofler).

EXAMPLE 6

Reserpine-1-propionamidine (a) Preparation of reserpine-1-(ethyl iminopropionate).—About $\frac{1}{200}$ mol (3.3 g.) of reserpine-1-propionitrile, 80 ml. of absolute ethanol and 80 ml. of anhydrous benzene were placed in a 250 ml. 3-necked flask provided with a magnetic stirrer, a condenser and a gas inlet tube for the admission of gaseous HCl. When the nitrile had dissolved, the mixture was brought to a temperature of between 0 and 5° C., and gaseous HCl was bubbled therethrough for 2½ hours. The mixture was then left to stand for 48 hours in a refrigerator.

(b) Preparation of reserpine-1-propionamidine.—The iminoester obtained in part (a) was dissolved in 60 ml. of absolute ethanol and then treated for 30 minutes at room temperature with a current of ammonia. After refluxing for 30 minutes and concentration to dryness, the resulting amidine hydrochloride was crystallised from isopropanol. M.P. (Kofler): pasty fusion from 245–250° C.

Analysis.—$C_{36}H_{48}N_4O_9CO_2$ dihydrochloride; molecular weight=751.68.—Theoretical (percent): C, 57.52; H, 6.44; N, 7.45; O, 19.16; Cl, 9.43. Found (percent): C, 57.37; H, 6.58; N, 7.57; O, 19.19; Cl, 9.30.

EXAMPLE 7

Rescinnamine-1-propionitrile

The operation was carried out as in Example 1, but rescinnamine was used as starting material in place of reserpine.

A product of the following empirical formula was obtained:

$C_{38}H_{45}N_3O_9$; molecular weight 687.79.—Theoretical (percent): C, 66.36; H, 6.59; N, 6.11; O, 20.94. Found (percent): C, 66.24; H, 6.83; N, 6.39; O, 20.54.

EXAMPLE 8

Descinnamine-1-propionamidine (a) Preparation of rescinnamine-1-(ethyl iminopropionate).—In a 500 ml. 3-necked flask were placed 4 g. (0.0058 mol) rescinnamine-1-propionitrile, prepared as in Example 6, 130 ml. of absolute ethanol and 130 ml. of anhydrous benzene. The nitrile was dissolved. The mixture was kept between 0 and 5° C. and gaseous HCl was bubbled therethrough for 2½ hours. The mixture was thereafter left to stand for 48 hours in a refrigerator.

(b) Preparation of rescinnamine-1-propionamidine.—The solution obtained in part (a) was concentrated to dryness and the residue dissolved in absolute ethanol. Ammonia was bubbled through the solution at room temperature for 30 minutes and the resulting solution was refluxed for 30 minutes. After concentration to dryness, the residue was dissolved in methylene chloride, filtered, and the filtrate was concentrated to dryness. The nitrile was extracted from the residue with benzene, and the remaining insoluble substance was recrystallised from isopropanol. The amidine obtained may be purified by chromatography on alumina or by crystallisation from a mixture of acetone and benzene.

Analysis.—$C_{38}H_{49}N_4O_9Cl$ (monohydrochloride); molecular weight 741.26.—Theoretical (percent): C, 61.56; H, 6.66; N, 7.56; O, 19.42; Cl, 4.78. Found (percent): C, 61.39; H, 6.80; N, 7.42; O, 19.59; Cl, 4.64.

M.P. (Kofler): 200–220° C. (very spread out).

The other alkaloid derivatives of this invention can be prepared by processes similar to those described in the above examples.

PHARMACOLOGICAL TESTS

Evaluation of the pharmacological activity of the compounds of the invention on the central nervous system, and their antihypertensive and cardiovascular properties, was made. Studies were made principally on the products of Examples 1, 2 and 3.

(I) Study of behaviour and determination of approximate $LD_{50}$

The compounds were administered to batches of 3 mice each orally and intravenously in doses varying in geometrical progression (at a factor of 2 or 3, i.e. 5, 10, 30, 60, 100 mg./kg. of body weight).

The results showed that the products of Examples 1, 2 and 3, given intravenously, are less toxic than reserpine, whose $LD_{50}$ when given intravenously to mice is about 25 mg./kg. The compounds of Examples 1 and 2 did not cause the deaths of the mice in doses of 100 and 60 mg./kg. respectively.

The $LD_{50}$ in mice of the compound of Example 3 when given intravenously is about 80 mg./kg. In the case of the three products, large doses (30 to 60 mg./kg.) produced symptoms similar to those obtained with reserpine in doses of approximately 2 mg./kg., i.e. ptosis, diminution of spontaneous activity, diminution of sensitivity to touch, trembling, passivity, diminution of gripping force, somnolence, respiratory disorders, defaecation and foetal position.

The compound of Example 1 was also given orally for comparison with reserpine. The symptoms observed with a given amount of reserpine were not produced until doses at least 10 times as high of the compound of Example 1 were administered. Reserpine is more toxic ($LD_{50}$, 80 mg./kg. oral) than the compound of Example 1.

(II) Trials concerning the central nervous system

The trials were carried out, apart from noted exceptions, on batches of 10 male mice, the injection doses representing varying fractions of the $LD_{50}$.

The results were shown as a percentage of animals that reached according to the time, a percentage of increase or diminution of a given effect, or by using an arbitrary marking system.

The trials were as follows:

(1) Rota-rod or turning-rod test according to Tripod J. et al., Arch., int. Pharmacodyn., 112, 319 (1957).

(2) Funnel test according to Boissier, J. R. et al., Medicina Exp., 3, No. 1, 81, (1960).

(3) Traction test according to Courvoisier, S., J. Clin. Exper. Psychopathol., 17, 25–27 (1956).

The results of these three tests Nos. 1 to 3 were as follows:

According to the Rota-red and funnel tests, the compounds of Examples 2 and 3 are only active with quite large does (40 and 30 mg./kg.), smaller doses not producing any result. The traction test was negative for the three compounds.

Reserpine in small doses is very active according to these three tests.

(4) Potentiation of barbituric narcosis.—The barbiturate (penthiobarbital) was injected intraperitoneally in a dose of 40 mg./kg., 20 minutes after the substance studied. The duration of sleep and the criterion of sleep i.e. the loss of the turning-round reflex, were noted. The results are expressed as a percentage of animals falling asleep in relation to the time.

The compound of Example 3, which is practically inactive in a dose of 15 mg./kg. when given intravenously, distinctly potentiates narcosis with penthiobarbital in a dose of 30 mg./kg. administered intravenously. The compounds of Examples 1 and 2 in doses of 10 and 40 mg./kg. respectively, given intravenously, are inactive.

Reserpine, on the other hand, has a very considerable effect in a dose of 2.5 mg./kg.

(5) Potentiation of narcosis with chloral.—The method adopted was the one described by L. Buchel et al., (Therapie, XVII, 1053–1094 (1962). Chloral hydrate was given in a dose of 325 mg./kg. intraperitoneally to batches of 10 mice, 20 minutes after the intravenous administration of the compound being tested.

Chloral narcosis is distinctly potentiated by the compounds of Examples 2 and 3 in doses of 40 and 30 mg./kg. given intravenously. The action of the compound of Example 1 in a dose of 10 mg./kg. is very moderate.

(6) Antagonism with regard to the effects of pentetrazole.—20 minutes after the administration of the product being studied, pentetrazole was given intravenously in a dose approximating to the $LD_{100}$ (60 mg./kg.). The percentages of trembling, crises and deaths were recorded. None of the three compounds studied antagonises the effects of pentetrazole.

(7) Activity by actography.—The method consists in recording the number of passages of an animal before two perpendicular light rays. Isolated mice or mice in groups of 2 are introduced into Dews-type activity cages (Apelab photoelectric actimeter) after intravenous injection of the products under test.

The activity is measured after 5 and 20 minutes. The results are expressed as a percentage of the increase or diminution of activity in relation to the (untreated) controls.

The compounds of Examples 2 and 3 have no effect on the activity by actography, while reserpine reduces it greatly even in a dose of 1 mg./kg. given intraperitoneally.

(8) Potentiation of toxicity of yohimbine.—This test has been described by Quinton, R. M., Brit. J. Pharmacol., 21, 51–66. Only the compound of Example 1 potentiates the toxicity of yohimbine in a dose of 100 mg./kg. given orally (40% of mortality).

(9) Antitremorine test.—This was carried out according to E. Frommel et al., Therapie, XV, 1175–1198 (1960). The three compounds studied are inactive in the antitremorine test.

(10) Antagonistic action with respect to strychnine given by slow perfusion.—The products to be tested were given 30 minutes before slow perfusion. The latter was carried out at a rate of 0.1 ml./min. with a Braun pump having a 50 ml. syringe with an extension in the form of a very fine catheter having at its end a fine needle inserted in the vein of the tail of the mouse. The concentration of the perfused strychnine solution was 0.075 mg./ml. Two times were recorded in succession, i.e. the time necessary to obtain the tonic crisis and the time necessary to cause death. From these times and with account taken of the weight of each animal, the doses in mg./kg. at which the symptoms of intoxication (tonic crisis) and death were produced, were calculated.

The compound of Example 3 was given in two doses: 30 and 60 mg./kg., 30 minutes before perfusion, intraperitoneally. The larger dose showed no significant difference from the controls as regards the dose causing the tonic crisis and the dose causing death. At 30 mg./kg., on the other hand, a significant difference (for P less than 0.01) appeared in the case of the lethal dose, which has higher in the animals treated than in the controls, indicating perhaps some slight protection against the toxicity of strychnine.

After administration of the compound of Example 2 in a dose of 40 mg./kg. 30 minutes before perfusion, the appearance of the tonic crisis was more delayed at a higher dose than in the control aminals (significant difference for P between 0.05 and 0.01).

On the other hand, there was no difference between the doses that caused death.

In conclusion, and taking account of the $LD_{50}$ of the novel compounds on intravenous administration, the novel compounds are much less toxic than reserpine, their depressive action is therefore reduced in comparison with that of reserpine in the case of the 1-propionitrile and 1-propylamine derivatives, and greatly reduced in the case of the 1-propionamidoxime derivative.

(III) Antihypertensive action in the rat with renal hypertension

To produce hypertension in rats, the method of Page, E. W. et al., (Am. J. Obstetr. Gynecol, 41, 53 (1941)) was used. This is intended to cause perinephritis with collodion.

Two different experimental procedures were used for studying the hypertensive action of the compounds in the trials:

(a) Administration of a small dose each day for several days and study of the changes in the arterial pressure in the course of time.

(b) Administration of a single dose and study of the changes in the arterial pressure for the 24 hours or 48 hours following the injection.

The compound of Example 1 was studied by the first procedure (a). This was given in solution in a 3% solution of ascorbic acid in physiological solution to 6 rats with hypertension in a daily dose of 1 mg./kg. intraperitoneally for 13 days. The treatment was then interrupted to permit the tension to rise again.

Reserpine was given, as a reference product, to 6 rats with hyptertension in a dose of 1 mg./kg. intraperitoneally under the same conditions, the treatment also being stopped after 13 days.

The results of the trial with the compound of Example 1 show that in 13 days a distinct reduction of the arterial pressure ($-25\%$ for the average pressure and $-16.5\%$ for the maximum pressure in relation to the controls with hypertension) was obtained for the batch treated with the compound of Example 1 in a daily dose of 1 mg./kg. given intraperitoneally. A less pronounced reduction was recorded in the case of the batch treated with reserpine used in the same dose (average pressure: $-16.5\%$ on the 11th day, $-11\%$ on the 13th day; maximum pressure: $-14\%$ on the 11th day, $-11.5\%$ on the 13th day).

After suspension of the treatments, the pressures returned to their initial values at the end of the 45th day after the start of the experiment. The compound of Example 1 therefore appears, from this quite severe experimental procedure, to be a little more active than reserpine.

In using the second procedure (b), the antihypertensive action of the compounds of Examples 1, 2 and 3 was studied by administering rats intraperitoneally with a dose of the compound equivalent to $\frac{1}{20}$ of the $LD_{50}$ dose:

product of Example 1:

$$\frac{750}{20} \simeq 37 \text{ mg./kg.}$$

product of Example 2:

$$\frac{395}{20} \simeq 20 \text{ mg./kg.}$$

product of Example 3:

$$\frac{58}{20} \simeq 3 \text{ mg./kg.}$$

The product of Example 1 was administered in suspension and the products of Examples 2 and 3 in solution in a 9% solution of sodium chloride in physiological solution.

Reserpine was used as the reference compound and was administered intraperitoneally in a dose equivalent to 2.5 mg./kg. The pressure changes caused by the administration of these compounds was compared with the controls with hypertension which had received an intraperitoneal dose of 9% solution of sodium chloride physiological solution.

The average (diastolic) pressures and the maximum (systolic) pressures were measured 1, 3, 5, 24, 30 and 48 hours after administration of the compounds. Seven rats were used as controls, seven were treated with the compound of Example 2, five were treated with the product of Example 1, five with the product of Example 3 and five with reserpine. From the measurements taken on each rat at the various times, the variations (plus or minus) in the average and maximum pressures were calculated and expressed with reference to the pressures measured prior to administration of the compounds. The results obtained for each of the products were compared with those for the controls with hypertension by the Student test.

The results are set out in the following two tables.

TABLE 1

[Antihypertensive activity of reserpine and the compounds of Examples 1 to 3: variations in the average pressure]

| Time after administration (hrs.) | Controls with hypertension Δ | Reserpine, 2.5 mg./kg. Δ | | Compound of Example 1, 37 mg./kg. Δ | | Compound of Example 2, 20 mg./kg. Δ | | Compound of Example 3, 3 mg./kg. Δ | |
|---|---|---|---|---|---|---|---|---|---|
| | | Δ | S.D. | Δ | S.D. | Δ | S.D. | Δ | S.D. |
| 1 | −0.04 | −1.2 | N.S. | −1.6 | N.S. | −2.1 | P=0.05 | +0.1 | N.S. |
| 3 | −0.3 | −2.1 | P=0.05 | −2.1 | P=0.05 | −3.4 | P=0.001 | −1.1 | N.S. |
| 5 | −0.07 | −3.1 | P=0.05 | −3.3 | P=0.02 | −1.8 | N.S. | −2.4 | N.S. |
| 24 | −1.2 | −2.2 | N.S | −5.9 | P=0.001 | −3.3 | P=0.05 | −3.2 | P=0.05 |
| 30 | −0.37 | −3.1 | P=0.01 | −4.3 | P=0.01 | −3.1 | P=0.05 | −2.8 | N.S. |
| 48 | −0.44 | −2 | N.S. | −4.8 | P=0.001 | −2 | P=0.01 | −0.6 | N.S. |

NOTE.—Δ=variation in average pressure (cm. Hg); S.D.=significance of the difference from the controls N.S.=no significance.

TABLE 2

[Antihypertensive activity of reserpine and the compounds of Examples 1 to 3: variations in the maximum pressure]

| Time after administration (hrs.) | Controls with hypertension Δ | Reserpine, 2.5 mg./kg. | | Compound of Example 1, 37 mg./kg. | | Compound of Example 2, 20 mg./kg. | | Compound of Example 3, 3 mg./kg. | |
|---|---|---|---|---|---|---|---|---|---|
| | | Δ | S.D. | Δ | S.D. | Δ | S.D. | Δ | S.D. |
| 1 | −0.08 | −1.8 | N.S. | −1.4 | N.S. | −2 | N.S. | −0.1 | N.S. |
| 3 | −0.42 | −2.4 | P=0.05 | −2.8 | P=0.02 | −3.6 | P=0.001 | −0.7 | N.S. |
| 5 | −0.41 | −3.7 | P=0.01 | −3.8 | P=0.01 | −2.1 | N.S. | −2.8 | P=0.05 |
| 24 | −1.1 | −2 | N.S. | −6.4 | P=0.01 | −3.5 | P=0.05 | −3.1 | N.S. |
| 30 | −0.40 | −4.1 | P=0.001 | −4.6 | P=0.01 | −3.4 | P=0.01 | −2.8 | P=0.05 |
| 48 | −0.45 | −2.6 | P=0.1 | −5.5 | P=0.001 | −2 | P=0.02 | −0.6 | N.S. |

NOTE.—Δ=variation in average pressure (cm. Hg); S.D.=significance of the difference from the controls; N.S.=no significance.

Referring to these results:

(1) Speed of action: Of the four compounds tested, only the compound of Example 2 showed rapid effects, the average pressure dropping by 2.1 cm. Hg (P=0.05) after only one hour. The activity of the reserpine and the compound of Example 1 are clearly apparent at the end of 3 hours. The effect of the compound of Example 3 is only apparent after 5 or 24 hours.

(2) Duration of the activity: In all cases the activity is prolonged. The diminutions in the average and maximum pressures are still significant, in the case of reserpine and the compounds of Examples 1 and 2, 48 hours after administration. The compound of Example 3 was only active for a relatively short time, the effects disappearing after 24 hours.

(3) Kinetics and intensity of activity: The compound of Example 1 appears to be the most active from the point of view of intensity (or degree) of activity, the difference between this and the other three compounds being significant 24 hours after administration.

Finally, it appears that the compound of Example 2 has a two phase activity: a rapid drop in pressure occurs followed by a rise at the end of 5 hours and then, after 24 hours, a hypertension occurs similar to the first but much more prolonged (the phenomenon recurs several times indicating a double action mechanism).

(IV) Cardiovascular action in anaesthetised normotensive dogs

The dogs are anaesthetised with chloralose in a dose of 100 mg./kg. given intravenously. If the animals tend to wake up during the anaesthesia they are also given a suitable dose of Nembutal intravenously to send them to sleep again.

The arterial pressure is recorded on a Sanborn physiograph by means of a cannula inserted in the carotid artery and connected to a pressure gauge, together with the femoral flow and the renal volume. The cardiac rhythm is calculated from the electro-cardiogram recording.

The reactions following various common stimuli are recorded, in particular: injection of adrenaline 5γ/kg.

Injection of serotonin 20 γ/kg.

These tests are resumed after intravenous injection of the product being tested. The reactions that may follow the administration of the compound are also recorded.

The cardiovascular action of the compound of Example 2 was also studied according to these tests. In the dog, by repetition of doses of approximately 5 mg./kg. or 10 mg./kg. of the compound of Example 2, the following results were obtained: appreciable changes in the cardiac rhythm, femoral flow and renal volume were not observed. The reactions following pressure on the eyeballs (oculocariac reflex), stimulation of the peripheral X and injection of adrenaline or serotonin were not modified after treatment with the compound of Example 2.

On the other hand, a distinct gradual lowering of the arterial pressure in the course of time was noted after repetition of the injections of this compound:

| Dog No. | Arterial pressures before injection, cm. Hg | Number of injections | Arterial pressures after injections |
|---|---|---|---|
| I | 11.6 | 2 (each 5 mg./kg.) | 9 cm. Hg one hour after 1st injection. |
| II | 15.4 | 3 (each 5 mg./kg.) | 13.5 cm. Hg two hours after 1st injection. |
| III | 14.4 | 2 (each 10 mg./kg.) | 11 cm. Hg two hours after 1st injection. |

These results are significant, since the blood pressure of a dog under the conditions of the experiment normally remains very stable for several hours only if it is given the stimuli and injections provided for in the experimental procedure indicated above.

The hypertension caused by the occlusion of the carotid artery or stimulation of the central X is very reduced or nullified. This suggests that the antihypertensive action of the compound of Example 2 depends on a central mechanism.

According to the trials described above, the following conclusions may be drawn:

The three derivatives studied are dinstinctly less toxic than reserpine, the compound of Example 2 being most marked in this respect.

The psychotropic activity seems to be very slight in comparison with that of reserpine, or even nonexistent, according to the doses used. The following is a classification of the three compounds in order of decreasing psychotropic activity: compound of Example 1, compound of Example 3, compound of Example 2.

The antihypertensive activity of the three products is less strong than that of reserpine and seems to decrease in the order: compound of Example 1, compound of Example 3, compound of Example 2.

However, the activity is still appreciable at small non-depressive doses, in particular in the case of the compound of Example 2, which has the advantage of preserving a proper antihypertensive action while the psychotropic activity has disappeared.

The compound of Example 2 has a considerable hypotensive action, but this is slow to become established in the anaesthetised normotensive dog.

With regard to the mechanism of action of the compounds of the invention, we believe, although we do not wish to be limited by this hypothesis, that it is due to blocking of the liberation of adrenaline at the receptors, ganglionic blocking or central blocking. Certain central reflexes are reduced or eliminated as indicated above.

(V) Cardiovascular action in anaesthetised normotensive rat

Male rats of the Charles River CD stock having an average weight of 500 g. were anaesthetised with urethane in a dose of 1.25 g./kg. administered intraperitoneally. A cannula was inserted in the vein of the penis for the administration of the products to be tested. A catheter filled with heparin-containing sodium chloride physiological solution was inserted in the carotid artery and connected to the mercury collector of the pressure-measuring chain of a two-pen Racia polygraph. The electrocardiogram was recorded as deflection $D_2$. The animals received heparin intravenously to prevent any risk of coagulation at the carotid artery.

The first injection of the product was carried out at the 40th minute of the experiment in the case of the compound of Example 2. 9 animals were treated with the compound of Example 2 in a dose of 10 mg./kg. given intravenously.

The effects of reserpine in a dose of 2 mg./kg. (intravenous) on the pressure and cardiac rhythm of 5 rats was also studied for comparison under the same conditions.

RESULTS (1) Action on arterial pressure

After the first injection, it was observed that reserpine produced, in the course of time, a distinct reduction of pressure reaching —30% at the 105th minute after the injection; in the case of the compound of Example 2 the hypotension obtained was not so pronounced; it reached —20% at the 30th minute and then rose again slightly, being stabilised at a level below normal.

(2) Action on cardiac rhythm

Reserpine, like the compounds of the invention, did not significantly affect the cardiac rhythm after the first or second injections.

(3) Modifications of pressure effects of adrenaline (5 γ/kg.) and noradrenaline (5 γ/kg.) after injection of the products Reserpine potentiates adrenaline and noradrenaline, particularly as regards alteration of hypertension.

After the injection of the compound of Example 2, the change in, and duration of, hypertension obtained with adrenaline were very distinctly increased.

The effects of noradrenaline were unchanged after the first injection, and only the alteration of hypertension was increased by a moderate amount after the second injection.

Thus, in the anaesthetised normotensive rat, the compound of Example 2 gave a quite distinct and prolonged hypotensive effect, potentiation of the hypertensive effects of adrenaline, and little modification of the effects of noradrenaline.

I claim:

1. A reserpine derivative of the formula

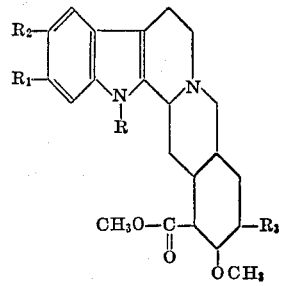

wherein $R_1$ and $R_2$ are selected from the group consisting of a hydrogen atom and a methoxy group, $R_3$ is selected from

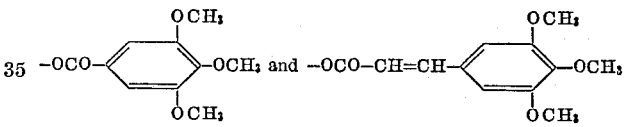

and R is selected from a 2-cyanoethyl, 3-oximino-3-aminopropyl, 3 - aminopropyl, 2 - carbamidinoethyl, 3-guanidinopropyl group, and 3 - nitroguanidinopropyl group, and acid addition salts thereof.

2. A reserpine derivative of claim 1 which is reserpine-1-propionitrile or an acid addition salt thereof.

3. A reserpine derivative of claim 1 which is reserpine-1-propionamidoxime or an acid addition salt thereof.

4. A reserpine derivative of claim 1 which is reserpine-1-propylamine or an acid addition salt thereof.

5. The compound of claim 1 which is the rescinnamine-1-propionitrile.

6. A compound of claim 1 which is reserpine-1-propylnitroguanidine.

References Cited

UNITED STATES PATENTS

| 3,119,819 | 1/1964 | Robison et al. | 260—240 A L |
| 3,318,877 | 5/1967 | Ulshafer et al. | 260—240 A L |
| 3,472,872 | 10/1969 | Bell | 260—326.15 |

FOREIGN PATENTS

| 360M | 4/1961 | France | 260—287 A |

JOHN D. RANDOLPH, Primary Examiner

U.S. Cl. X.R.

260—236 Y, 283 C N, 286 B, 287 A; 424—262